United States Patent [19]

Kameshita

[11] Patent Number: 4,610,178

[45] Date of Patent: Sep. 9, 1986

[54] SPEED CHANGER FOR VEHICLES USED IN CONSTRUCTION WORK

[75] Inventor: Ryutaro Kameshita, Ishioka, Japan

[73] Assignee: Toyo Unpanki Co., Ltd., Japan

[21] Appl. No.: 625,307

[22] Filed: Jun. 27, 1984

[51] Int. Cl.⁴ .............................................. B60K 20/10
[52] U.S. Cl. ........................................ 74/335; 74/878
[58] Field of Search ............ 74/523, 843, 469, 471 R, 74/878, 335; 180/333; 200/157, 61.91, 61.85

[56] References Cited

U.S. PATENT DOCUMENTS

| | | | |
|---|---|---|---|
| 1,756,051 | 4/1930 | Burke | 74/879 |
| 1,822,338 | 9/1931 | Clemens | 74/879 X |
| 3,675,508 | 7/1972 | Blank | 74/359 X |
| 3,800,969 | 4/1974 | Steiger | 180/333 X |
| 3,937,294 | 2/1976 | Haddock | 74/523 X |
| 4,140,200 | 2/1979 | Tucek | 180/333 |
| 4,454,785 | 6/1984 | Purrer | 74/471 R X |

Primary Examiner—Allan D. Herrmann
Assistant Examiner—Joseph M. Rolnicki
Attorney, Agent, or Firm—Wenderoth, Lind & Ponack

[57] ABSTRACT

A speed changer for a vehicle such as a track shovel is proposed with which the vehicle speed can be easily changed from one speed to another while operating a shovelling control lever. A changeover switch is mounted on the grip of the shovelling control lever.

2 Claims, 3 Drawing Figures

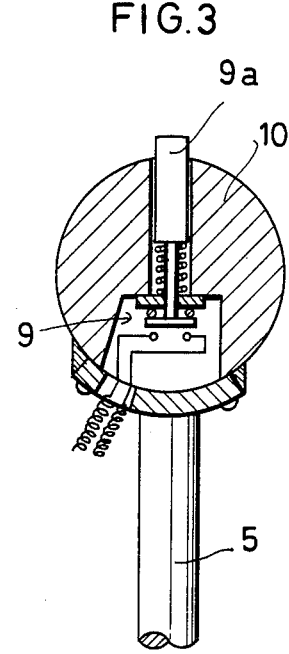
FIG. 3
FIG. 1 PRIOR ART
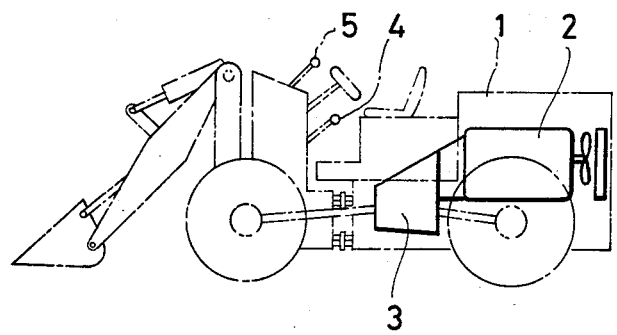
FIG. 2
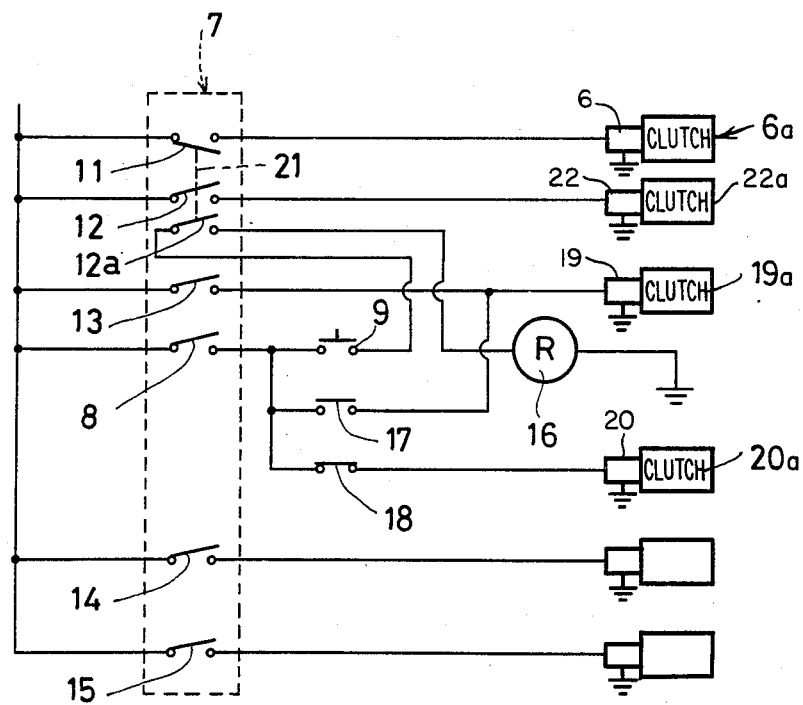

SPEED CHANGER FOR VEHICLES USED IN CONSTRUCTION WORK

The present invention relates to a speed changer for vehicles used in construction work.

In conventional vehicles used in construction work, such as a tractor shovel such as shown in FIG. 1, an engine 2 is disposed at the rear of a body 1, and a speed change gear 3 through which the driving force of the engine 2 is transmitted to the wheels is disposed in the lower central part of the body 1. A speed change control lever 4 for controlling the speed change gear 3, irrespective as to whether it is mechanical or electrical, is provided separately from a shovelling control lever 5. The vehicle is moved at a second speed toward earth or sand until the bucket teeth reaches the position where it is about to be thrusted into the earth or sand. Then the operator of the vehicle has to operate the shovelling control lever 5 simultaneously while gearing down the vehicle to a first speed so as to obtain a large thrust. These complicated simultaneous operations have required a great deal of skill.

It is an object of the present invention to eliminate the above-described disadvantage by providing a speed changer which is simple in operation and is much easier to use in changing the speed of the vehicle while operating the shovelling control lever.

According to the present invention, the gear can be easily changed from one speed to any other by a changeover switch provided on the grip of the shovelling control lever.

With the above-described object in view and as will become apparent from the following detailed description, the present invention will be more clearly understood in connection with the accompanying drawings, in which:

FIG. 1 is a side view of a tractor shovel provided with a conventional speed changer;

FIG. 2 is a circuit diagram of one form of an electric circuit for the speed changer of the present invention; and FIG. 3 is a sectional view of the grip of the shovelling control lever.

According to the present invention, a speed change gear for controlling the speed of tractor shovel is operated by selectively engaging and disengaging a plurality of hydraulic clutches. Each of the hydraulic clutches is provided with a solenoid valve so as to work separately. A switch unit 7 for the operation of the solenoid valves is provided. A pushbutton changeover switch 9 for changing the gear from the second speed to the first speed when a second speed switch 8 in the switch unit 7 is closed is provided on the grip 10 of the shovelling control lever 5. (FIG. 3)

Thus the conventional speed change control lever 4 for controlling the speed change gear 3 is replaced with the switch unit 7 in this embodiment, which includes a triple pole, single throw switch comprising a reverse switch 11, a forward switch 12, and an interlock switch 12a, which is closed by interlock mechanism 21 when the forward switch 12 is closed, a first speed switch 13, a third speed switch 14, a fourth speed switch 15, and an interlock mechanism 21 interlocking the reverse switch 11 with the forward switch 12 in such a way that the opening of one of them is interlocked with the closing of the other. Further, a relay 16. Having an A contact 17 and a B contact 18, a first speed solenoid valve 19, and a second speed solenoid valve 20 are also provided.

In operation, the forward switch 12 is closed to engage a solenoid valve 22 to thereby engage a forward clutch 22a, and a second speed switch 8 is closed to energize a solenoid valve 20 and thereby engage a second speed clutch. The vehicle will dash at the second speed toward earth or sand. While operating the shovelling control lever 5, the operator presses a push button 9a provided on the grip 10 of the shovelling control lever 5 to close the changeover switch 9. Since the interlock switch 12a has been closed, the relay 16 will be energized by closing the changeover switch 9. As a result, the B contact 18 will open and the second speed solenoid valve 20 will be deenergized. Simultaneously the A contact 17 will close and the first speed solenoid valve 19 be energized. Thus the gear is changed from the second speed to the first speed.

After the earth or sand has been dipped up, the reverse switch 11 is closed to engage a reverse clutch 6a. The forward switch 12 will be opened through the interlock mechanism 21 so that the relay 16 will be deenergized. Now the B contact 18 will close and the second speed is restored.

The changeover switch 9 may be provided in the form of a foot switch.

What are claimed are:

1. A speed changer for changing a speed change gear of a tractor shovel, comprising:
   a first speed solenoid valve means for actuating a first speed clutch adapted to be connected to said speed change gear;
   a second speed solenoid valve for actuating a second speed clutch adapted to be connected to said speed change gear;
   a switch unit, said unit including a first speed switch operably connected to said first speed solenoid valve for activating and deactivating said first speed solenoid valve, a second speed switch operably connected to said second speed solenoid valve for activating and deactivating said second speed solenoid valve, a triple pole single throw switch comprising a reverse switch, a forward switch and an interlock switch, all three of which are interconnected by an interlocking mechanism, said interlock switch being closed when said forward switch is closed and said reverse switch is open and said interlock switch being open when said forward switch is open and said reverse switch is closed;
   a relay, connected between said second speed switch and said second speed solenoid valve, having an A contact and a B contact, said relay being operably connected to said interlocking switch, said A contact being operably connected to said first speed solenoid, said B contact being operably connected to said second speed solenoid, said B contact being closed and said A contact being open when said relay is deenergized and said A contact being closed and said B contact being open when said relay is energized; and to
   a changeover switch operably connected to said interlocking switch and said relay, said changeover switch operable to energize said relay when said changeover switch is closed and operable to deenergize said relay when said changeover switch is open;
   whereby the forward speed of a tractor shovel can be changed from a second speed to a first speed by closing a single changeover switch even though the second speed switch of said switch unit is closed and said first speed switch of said switch unit is open.

2. The speed changer of claim 1, wherein said changeover switch is a push button switch mounted on a grip of a shovelling control lever of said tractor shovel.

* * * * *